United States Patent [19]
Paleos et al.

[11] 3,807,951
[45] Apr. 30, 1974

[54] NEUTRAL BATH DYEING OF POLYOLEFINS WITH ACID DYES

[75] Inventors: Constantinos Paleos, Athens, Greece; Wassily Poppe, Lombard, Ill.

[73] Assignee: Standard Oil Company, Chicago, Ill.

[22] Filed: July 21, 1972

[21] Appl. No.: 273,848

[52] U.S. Cl. .................................. 8/180, 260/857
[51] Int. Cl. ............................................. D06p 3/00
[58] Field of Search ............... 8/180, 168, DIG. 18; 260/857

[56] References Cited
UNITED STATES PATENTS 3,098,697 7/1963 Cappuccio et al. ............. 8/DIG. 18
3,361,843 1/1968 Miller et al. ....................... 260/857
3,502,422 3/1970 Miller et al. ....................... 8/168 X Primary Examiner—Leon D. Rosdol
Assistant Examiner—T. J. Herbert, Jr.
Attorney, Agent, or Firm—Gunar J. Blumber; Arthur G. Gilkes; William T. McClain

[57] ABSTRACT

A method of dyeing a grafted hydrocarbon polymer containing at least one polymerizable terminal olefin with an acid dye in the pH range of about 6 to about 7 which comprises the steps of quaternizing the grafted polymer with a dialkyl sulfate and contacting the resulting material with an acid dye at a pH of about 6 to about 7.

6 Claims, No Drawings

NEUTRAL BATH DYEING OF POLYOLEFINS WITH ACID DYES

SUMMARY OF THE INVENTION

This invention relates to a method for the neutral dyeing of a grafted hydrocarbon polymer containing at least one polymerizable terminal olefin with an acid dye and, more specifically, to the neutral dyeing of a grafted hydrocarbon polymer containing at least one polymerizable terminal olefin with an acid dye by increasing the susceptibility to attachment by the acid dye of the nitrogen atoms in the grafted portions of said polymer by quaternization of said nitrogen atoms with a dialkyl sulfate and thereafter contacting the grafted and quaternized polymer with an acid dye in a medium having a pH of about 6 to about 7.

BACKGROUND OF THE INVENTION

Synthetic fibers made from polyolefins have many desirable properties and have been used extensively as components of textile products. The chemical inertness of the polyolefins and their consequent resistance to conventional dyeing techniques used for natural fibers and certain synthetic fibers has led to a number of techniques to overcome this disability and improve their dyeability. Among these have been (1) the addition of transition-metal-ion-containing compounds to the polyolefin, (2) the chemical modification of the polyolefin by copolymerizing or grafting dye acceptor molecules with or on the polyolefin, and (3) the blending of the polyolefin and a small amount of a second polymer which contains dyeable sites.

One method of improving the dyeability of polyolefins to acid dyes has been to graft a nitrogen-containing monomer onto the polymer which then acts as a site of attachment for the acid dye. When subsequent dyeing is accomplished in a bath having a pH of about 3 to 4, this method gives an acceptable color for many acid dyes. However, for other uses, the carpet backing industry for example, dyeing is done at pH of about 6 or 7 and in this pH range the nitrogen sites of the grafted polymer will not pick up the acid dye molecules to the extent required for suitable dyeing.

One way which has been found to avoid the problem of neutral bath dyeing is to quaternize the nitrogen sites on the grafted chain with alkyl halides as it has been found that quaternized nitrogen atoms at the grafted sites will pick up acid dye molecules to the extent required for adequate dyeing. Unfortunately, the presence of halide in the quaternizing substance causes discoloration of the polyolefin in subsequent operations which leads to color variations in the finished product.

Now it has been found that by using a dialkyl sulfate for the quaternizing agent, quaternization of polyolefins grafted by nitrogen-containing monomers can be accomplished to yield materials which, when treated with acid dye in neutral media, show colorfast properties under a variety of conditions and are not subject to the above-mentioned disability of polyolefins quaternized by alkyl halides.

STATEMENT OF THE INVENTION

Any polyolefin which is graftable with a nitrogen-containing monomer is usable for the instant invention. More preferably, polypropylene or a copolymer of propylene and a second $C_2$ to $C_8$ terminal olefin is the material used. In the preferred embodiment herein wherein the grafted polymer or copolymer is in fiber form, it is of course necessary to choose a polyolefin which can be prepared in this physical form.

The grafting process used is not critical and any one of the grafting processes known to those skilled in this art, preferably one which does not lead to a discolored graft polymer, is usable herein. For example, dry grafting such as that described in British Pat. No. 879,195 or slurry grafting such as that described in Canadian Pat. No. 765,457 is usable. Grafting may be done prior to or after the polyolefin is spun but it is preferable to graft the polyolefin prior to spinning.

Grafting monomers which are useful for the instant invention include such materials as 2-vinylpyridine (2-VP), 4-vinylpyridine (4-VP), 2-methyl-5-vinylpyridine (MVP), N-vinyl-2-pyrrolidone and 2-(dialkylamino)alkyl or 2-(alkylamino)alkyl methacrylates such as 2-(dimethylamino)ethyl methacrylate or 2-(t-butylamino)ethyl methacrylate. The preferred grafting monomers are 4-vinylpyridine and 2-methyl-5-vinylpyridine. Since these nitrogen-containing monomers have a tendency to form colored products on standing which can discolor the grafted polymer, it is preferred that the grafting monomer just prior to use be purified, for example, by washing with alkali and distilling or, alternatively, steam distilling.

It has been found that the permeability of the grafted and quaternized polyolefin to the acid dye is improved by the addition of a monomer such as styrene during the grafting process. This addition improves the depth of the shade of the dyed polyolefin and also improves the receptivity of the grafted polyolefin to disperse dyes. It is assumed that the advantage of the styrene arises because it grafts to the polyolefin along with the nitrogen-containing monomer.

The minimum nitrogen-containing monomer concentration for the graft reaction product is determined by the minimum amount of nitrogen which will impart acceptable dyeability to the grafted polyolefin and also by the economics of the grafting process. In general, it has been found that a nitrogen content of about 0.2 weight percent to about 1.0 weight percent nitrogen in the grafted polyolefin is useful, more preferably, a nitrogen content of about 0.25 to about 0.7 weight percent is used and, most preferably, sufficient monomer to obtain a grafted polyolefin containing about 0.3 to about 0.5 weight percent nitrogen is employed. In the case of a vinylpyridine and polypropylene, for example, it appears that about 0.38 weight percent of nitrogen, about 4 to about 5 weight percent grafted nitrogen-containing monomer is optimum.

In one variation of the instant process, a higher nitrogen-content grafted polyolefin than is to be used is prepared and the latter is blended with olefin homopolymer to obtain a weight percent of nitrogen in one of the above ranges. This procedural variant appears to have some economic advantages.

The amount of non-nitrogen-containing monomer, for example styrene, added to open up the grafted polyolefin and improve the dye shade is based on the amount of nitrogen-containing monomer used. In general, it varies from about a 1:10 mole ratio, styrene to 2-vinylpyridine for example, to about a 1:1 mole ratio. More preferably, the mole ratio runs from about 1:5 to about 1.5:5.

Initiators used for grafting include 2,5,-dimethyl-2,5,-bis(2-ethylhexanolperoxy)hexane (Lupersol 256, Pennwalt-Lucidol), benzoyl peroxide, lauryl peroxide and t-butyl peroctoate (TBOCT). Preferably, t-butyl octoate or Lupersol 256 is used as they produce the highest grafting efficiencies and the least colored grafted product.

In the preferred embodiment wherein the polyolefin to be dyed is in fiber form, it is preferable to spin the fiber after grafting and before quaternization. It has been found that if the quaternization process is carried out prior to spinning that the fiber spinning process is susceptible to water carry-over and a quality fiber is not produced. Methods of spinning polyolefins are well known to those skilled in this art and need not be described. For polypropylene, however, a material having a melt index of about 3 to about 6 (ASTM D 1238) has been found useful for melt spinning.

In general, the polyolefin is stabilized with such materials as distearothiodipropionate, titanium dioxide, calcium stearate, Tinuvin 327, Irganox 1093 or mixtures thereof prior to the spinning process. Usefully, the amount of stabilizer or stabilizer mixture is no more than about 1 percent by weight of the solid to be spun and, more preferably, it is less than about 0.75 weight percent. The quality of the spun fiber is enhanced by making certain that prior to the extrusion all components of the solid to be spun are thoroughly mixed.

Quaternization is accomplished using a lower alkyl, dialkyl sulfate, preferably dimethyl sulfate. By lower alkyl a hydrocarbon radical of from one to about six carbon atoms is meant here.

The quaternization process is accomplished by briefly contacting the grafted polyolefin with the quaternizing substance or a mixture thereof with a solubilizing medium. In the preferred embodiment herein, this is accomplished by running the polyolefin fiber continuously through neat dialkyl sulfate or through a mixture of the dialkyl sulfate and a solubilizing solvent or solvent mixture. Preferably, a mixture of water and the quaternizing agent is used, but non-aqueous solubilizing solvents or their mixtures, for example toluene, may be used to decrease the contact time for quaternization.

The concentration of the quaternizing agent, if a mixture is used, is usefully between about 10 and about 50 weight percent, more preferably, between about 10 and about 30 weight percent, and, most preferably, between about 10 and about 20 weight percent.

The time of contacting of the polyolefin and quaternizing agent depends upon the physical form of the grafted polyolefin used. Where the surface to volume ratio is high and/or the permeability of the polyolefin is high, shorter contact times may be used. In the preferred embodiment wherein the fiber form of a polyolefin is quaternized, a contact time of at least a minute is useful, more preferably, a contact time in the range of about a few minutes to about an hour is used. The quaternizing reaction is rapid, however, and the contact time is mainly dictated by the availability of the basic nitrogen sites on the polyolefin to the quaternizing solvent.

Suitable temperatures for the quaternizing reaction are usefully in the 15° to 40°C. range, but, more preferably, a temperature of about 20° to about 30°C. is chosen.

Dyeing with the acid dyes is done using a procedure which depends on the physical form of polyolefins employed and are well known to those skilled in this art. Specifically, for use in the preferred embodiment wherein polyolefin fibers are employed, enough dye and wetting agent, for example Lyogen MS, are mixed with water to give a water to solids added ratio of about 60:1 and the fiber is immersed for a period up to about two hours in the solution which is held at about the boiling point. The fiber is then cooled to ambient temperature, rinsed with water and scoured with an aqueous solution of wetting agent, for example Igepon T-51, at about 180°F. for a short period. Finally, the fiber is again cooled to ambient temperature, rinsed and dried.

While the invention is described in connection with the specific examples below, it is to be understood that these are for illustrative purposes only. Many alternatives, modifications and variations will be apparent to those skilled in the art in the light of the below Examples and such alternatives, modifications and variations will fall within the scope and spirit of the appended claims.

Example I

The dry-graft reactions were run in a 3 liter resin flask equipped with stirring, nitrogen purge, and a thermometer which extends into the powder. Generally the stirring rate was around 1,000 r.p.m., but lower rates can be used as long as they are rapid enough to effect good heat transfer during polymerization.

The resin flask was charged with 500 grams of polypropylene powder of flow rate 3 to 4 grams per 10 minutes (ASTM D 1238). The powder was then deaerated in a vacuum oven overnight. The oven was opened with a nitrogen purge and the flask was positioned over a constant temperature bath and fitted with a nitrogen purge. An alternative to the overnight deaeration is to evacuate the oven and refill it with nitrogen repeatedly five or more times. Before the flask was placed in the temperature bath the monomer and initiator were added dropwise from an addition funnel and the rate of addition was regulated so that no lumping or uneven agglomeration occurred in the powder. For most experiments either 30, 50 or 100 milliliters of monomer containing 0.5, 1.0 or 1.5 percent by weight of initiator was added.

After the monomer and catalyst were thoroughly mixed with the powder the flask was placed in the bath which was generally at about 80°C. The choice of reaction temperature is governed mostly by the decomposition rate of the initiator. The time for the reaction is 1, 2, 4, or 6 hours. However, it has been generally concluded that the reaction is essentially (90 percent) over when the powder temperature reaches its maximum (30 to 45 minutes).

At the completion of the reaction the powder was dumped into a flat pan and placed in a vacuum oven overnight at 50° or 110°C. using a vacuum of 25 to 30 inches of mercury to remove any unreacted monomer.

Example II

Larger quantities of dry-grafted polyolefin were made using a one cubic foot liquid-solid processor following essentially the technique of Example I. The initiator was t-butyl peroxyoctoate (TBOCT) and was about 1.5 weight percent of the monomer added. The results are shown below.

TABLE I

Grafting of Polypropylene Powder

| Monomer(s) Used | Monomer amount (weight percent of the polypropylene used) | Grafting Efficiency (percent) |
|---|---|---|
| MVP | 7 | 4.1 |
| MVP | 17 | 2.0 |
| MVP, 2-VP | 5.3, 1.7 | 5.5 |
| MVP, 2-VP | 12.7, 4.3 | 2.1 |

TABLE II

Dye Evaluation of a Quaternized 4-vinylpyridine-Polypropylene Fiber ****

| Dye | Color Index Name | Light Fastness** | Wash Fastness*** Shade Change | Wash Fastness*** Spinning | Dry Cleaning*** Shade Change | Dry Cleaning*** Staining |
|---|---|---|---|---|---|---|
| Alizarine Fast Blue RB | Acid Blue 25 | 3 (4)* | 4 (3-4) | 5 (4) | 4-5 (4) | 4 (4) |
| Calcofast Neutral Yellow G | Acid Yellow 151 | 6 (6-7) | 5 (4-5) | 3-4 (5) | 1-2 (-) | 3-4 (-) |
| Neolan Red 3B | Acid Red 191 | 4 (4) | 4 (3) | 5 (-) | 5 (-) | 3 (-) |
| Merpacyl Red G | — | - (-)* | 5 (5) | 3-4 (-) | 5 (4-5) | 3-4 (-) |
| Merpacyl Yellow 4G | — | 4 (6) | 5 (5) | 5 (-) | 2 (-) | 4 (-) |
| Merpacyl Blue 2GA | Acid Blue 40 | 3 (4-5) | 5 (5-4) | 4 (-) | 5 (-) | 4 (-) |
| Ahcoquionone Brill. Cyanine Green 5Gx | Acid Green 41 | 4 (6-7) | 4 (3) | 4-5 (4-5) | 4-5 (-) | 4 (-) |

* Bracketed values are AATCC data for the standard substrates. A dash is used where data is unavailable.
** Terms for fastness to light: 8-outstanding; 7-excellent; 6-very good; 5-good; 4-fairly good; 3-fair; 2-poor; 1-very poor.
*** Terms for wash fastness and dry cleaning: 5-excellent; 4-good; 3-fair; 2-poor; 1-very poor.
**** Test procedures and standards were taken from "Technical Manual of the American Association of Textile Chemists and Colorists", Howes Publishing Company, Vol. 41, New York (1965 ed.).

Example III

Slurry Grafting

The same type of equipment as in Example I was used except that a 5 liter flask was substituted for the 3 liter flask. The deaeration of the powder was also accomplished as described above. The amount of polypropylene powder was about 160 to 240 grams which was dispersed in 1200 milliliters of water giving a concentration of monomer of about 14 to 42 weight percent. The initiator amount was calculated on the weight of monomer used and was about 0.5 to 1.5 weight percent of the monomer. The reaction time was usually restricted to one hour. After completion of the reaction, the product was filtered and washed using a Buechner funnel and medium fast filter paper. Then the wet powder was spread on aluminum trays and dried in a vacuum oven overnight at 70°C. and 25 to 30 inches of mercury pressure.

Example IV

Additional slurry grafting was done in large quantities in a 500 gallon reactor using essentially the technique of Example III. In one run 50 pounds of MVP, 25 pounds of styrene, 175 pounds of polypropylene, 200 gallons of water, 60 grams of Triton X-100 and 6 ounces of TBOCT was used and in another run everything was the same as above except that 50 pounds of 4-VP was substituted for the 50 pounds of MVP.

Example V

The grafted polypropylenes made as above were stabilized prior to melt spinning using a stabilizer package containing 0.25 weight percent distearothiodipropionate, 0.15 weight percent calcium stearate, 0.35 weight percent Tinuvin 327, 0.2 weight percent $TiO_2$ and 0.2 weight percent Irganox 1093. These stabilizers were thoroughly blended with the grafted polyolefin powder prior to spinning using conventional techniques.

Example VI

The polypropylene fibers were quaternized by contacting the spun fiber with neat dimethyl sulfate or a mixture of dimethyl sulfate and water of at least 10 weight percent for periods between 2 minutes and 1 hour. Since all the fibers dyed equally well, the shorter period is deemed sufficient, at least when neat dimethyl sulfate is used, to obtain acceptable dyeability in a neutral bath dye.

Example VII

Dyeing of the quaternized fiber from Example VI was accomplished as follows: Enough dye and Lyogen MS, a wetting agent, were added to water to give a bath ratio of about 60:1 and to put about 2 weight percent of dye (based on fabric weight) on the fibers. The fiber was immersed in the bath and the bath boiled for two hours whereafter it was cooled to ambient temperature and rinsed with water. The fiber was then scoured 15 minutes at 180°F. with a water solution of Igepon T-51, a wetting agent, using about one part of the wetting agent for each 100 parts of the fiber to be scoured. The fiber was then cooled to ambient temperature, rinsed and dried. The results are shown below in Table II.

What is claimed is:

1. A process for the dyeing of textile fibers of polyolefin that contain at least one polymerizable terminal olefin, said polyolefin having been grafted with a nitrogen-containing monomer or a mixture of a nitrogen-containing monomer and styrene, which comprises quaternizing substantially all of the nitrogen atoms contained in the grafted polyolefin with a lower alkyl, dialkyl sulfate and contacting the quaternized and grafted polyolefin with an acid dye in a liquid medium having a pH of about 6 to about 7.

2. The process of claim 1 wherein said polyolefin is polypropylene.

3. The process of claim 2 wherein the nitrogen-containing monomer is 4-vinylpyridine or 2-methyl-5-vinylpyridine.

4. The process of claim 3 wherein the lower alkyl, dialkyl sulfate is dimethyl sulfate.

5. The process of claim 2 wherein the nitrogen-containing monomer is 2-vinylpyridine, 4-vinylpyridine, N-vinyl-2-pyrrolidone, a 2-(alkylamino)alkyl methacrylate or a 2-(dialkylamino)alkyl methacrylate.

6. The process of claim 5 wherein the dialkyl sulfate is dimethyl sulfate.

* * * * *